US009064220B2

(12) United States Patent
Brosche et al.

(10) Patent No.: US 9,064,220 B2
(45) Date of Patent: Jun. 23, 2015

(54) LINEAR VISUALIZATION FOR OVERVIEW, STATUS DISPLAY, AND NAVIGATION ALONG BUSINESS SCENARIO INSTANCES

(75) Inventors: Marianne Brosche, Heidelberg (DE); Holger Knospe, Wiesloch (DE); Guenter Pecht-Seibert, Muehlhausen (DE); Jochen Mayerle, Flein (DE); Ulrich Keil, Heidelberg (DE); Joachim Fessler, Grafenberg (DE); Otfried Geisau, Sinsheim-Eschelbach (DE); Uwe Schultz, Sinsheim-Eschelbach (DE); Jochen Steinbach, Bad Schoenborn (DE)

(73) Assignee: SAP SE, Walldorf (DE)

( * ) Notice: Subject to any disclaimer, the term of this patent is extended or adjusted under 35 U.S.C. 154(b) by 548 days.

(21) Appl. No.: 13/326,207

(22) Filed: Dec. 14, 2011

(65) Prior Publication Data

US 2013/0159907 A1 Jun. 20, 2013

(51) Int. Cl.
*G06F 3/048* (2013.01)
*G06Q 10/06* (2012.01)

(52) U.S. Cl.
CPC ..................................... *G06Q 10/06* (2013.01)

(58) Field of Classification Search
None
See application file for complete search history.

(56) References Cited

U.S. PATENT DOCUMENTS

| 5,877,766 | A | 3/1999 | Bates et al. |
| 7,113,923 | B1 | 9/2006 | Brichta et al. |
| 7,280,973 | B1 * | 10/2007 | Hack et al. ................. 705/7.11 |
| 7,711,694 | B2 | 5/2010 | Moore |
| 7,716,278 | B2 | 5/2010 | Beringer et al. |
| 7,735,022 | B2 | 6/2010 | Danninger et al. |
| 7,853,607 | B2 | 12/2010 | Moore et al. |
| 7,925,985 | B2 | 4/2011 | Moore |
| 8,046,716 | B2 | 10/2011 | Nelson |
| 8,181,150 | B2 | 5/2012 | Szpak et al. |
| 8,261,233 | B2 | 9/2012 | Szpak et al. |
| 8,332,405 | B2 | 12/2012 | Wagenblatt et al. |
| 8,468,491 | B2 | 6/2013 | Markovic |
| 8,621,421 | B2 | 12/2013 | Klaka et al. |
| 2002/0128890 | A1 | 9/2002 | Dick et al. |

(Continued)

OTHER PUBLICATIONS

"Object Interactions in Graphical Interface for Print Administration." *IBM Technical Disclosure*. Oct. 1996.

(Continued)

*Primary Examiner* — Stephen Alvesteffer
(74) *Attorney, Agent, or Firm* — Mintz Levin Cohn Ferris Glovsky and Popeo, P.C.

(57) ABSTRACT

Transactional data associated with a specific instance of a business scenario that includes an intersecting process feature requiring prerequisite action by a prerequisite process feature that is part of another business scenario can be linked to a scenario model providing a linearized representation in which other process features of the business scenario, the intersecting process feature, and the prerequisite process feature are arranged in a linear sequence. A navigation pane including a linear progression of user interface elements representing the linear sequence can be concurrently displayed with a work pane including other user interface elements corresponding to functionality provided by business software architecture features related to a currently selected process feature. The navigation pane display can expand at a selected user interface element to display additional user interface elements corresponding to process features involved in completion of the process feature corresponding to the selected first user interface element.

19 Claims, 6 Drawing Sheets

(56) References Cited

U.S. PATENT DOCUMENTS

| | | |
|---|---|---|
| 2003/0154090 A1 | 8/2003 | Bernstein et al. |
| 2003/0158832 A1 | 8/2003 | Sijacic et al. |
| 2003/0216928 A1 | 11/2003 | Shour |
| 2004/0010502 A1 | 1/2004 | Bomfim et al. |
| 2004/0030992 A1 | 2/2004 | Moisa et al. |
| 2004/0102990 A1 | 5/2004 | Jones |
| 2004/0107414 A1 | 6/2004 | Bronicki et al. |
| 2004/0119752 A1 | 6/2004 | Beringer et al. |
| 2004/0181775 A1 | 9/2004 | Anonsen et al. |
| 2005/0004825 A1 | 1/2005 | Ehrler et al. |
| 2005/0155000 A1 | 7/2005 | Weiler et al. |
| 2005/0262008 A1 | 11/2005 | Cullen et al. |
| 2006/0005140 A1* | 1/2006 | Crew et al. ............. 715/760 |
| 2006/0015383 A1 | 1/2006 | Beringer et al. |
| 2006/0074703 A1 | 4/2006 | Bhandarkar et al. |
| 2006/0074730 A1 | 4/2006 | Shukla et al. |
| 2006/0074736 A1 | 4/2006 | Shukla et al. |
| 2006/0074915 A1 | 4/2006 | Bhandarkar et al. |
| 2006/0149568 A1 | 7/2006 | Dreiling et al. |
| 2006/0206348 A1 | 9/2006 | Chen et al. |
| 2006/0206366 A1 | 9/2006 | Habib et al. |
| 2007/0156649 A1 | 7/2007 | Fischer |
| 2007/0162500 A1 | 7/2007 | Herwadkar |
| 2007/0192715 A1 | 8/2007 | Kataria et al. |
| 2007/0226038 A1 | 9/2007 | Das et al. |
| 2007/0233508 A1 | 10/2007 | Gillespie |
| 2007/0245300 A1 | 10/2007 | Chan et al. |
| 2007/0265862 A1 | 11/2007 | Freund et al. |
| 2007/0271526 A1* | 11/2007 | Powley ............. 715/810 |
| 2007/0276714 A1 | 11/2007 | Beringer |
| 2008/0040191 A1 | 2/2008 | Chakravarty et al. |
| 2008/0052274 A1 | 2/2008 | Moore et al. |
| 2008/0052358 A1 | 2/2008 | Beaven et al. |
| 2008/0065675 A1 | 3/2008 | Bozich et al. |
| 2008/0077530 A1 | 3/2008 | Banas et al. |
| 2008/0140472 A1 | 6/2008 | Gilat et al. |
| 2008/0168376 A1* | 7/2008 | Tien et al. ............. 715/772 |
| 2008/0177622 A1 | 7/2008 | Akkiraju et al. |
| 2009/0006146 A1 | 1/2009 | Chowdhary et al. |
| 2009/0070698 A1* | 3/2009 | Shurtleff et al. ............. 715/772 |
| 2009/0106640 A1 | 4/2009 | Handy et al. |
| 2009/0210268 A1 | 8/2009 | Fan et al. |
| 2010/0082292 A1 | 4/2010 | Pantaleano et al. |
| 2010/0083374 A1 | 4/2010 | Schmitlin et al. |
| 2010/0121740 A1 | 5/2010 | Reed et al. |
| 2010/0185474 A1 | 7/2010 | Frank |
| 2011/0071869 A1 | 3/2011 | O'Brien et al. |
| 2011/0082721 A1 | 4/2011 | Arni et al. |
| 2011/0125756 A1 | 5/2011 | Spence et al. |
| 2011/0145738 A1 | 6/2011 | Laugwitz et al. |
| 2012/0059842 A1 | 3/2012 | Hille-Doering et al. |
| 2012/0090037 A1 | 4/2012 | Levit |
| 2012/0136693 A1 | 5/2012 | Patil et al. |
| 2012/0311451 A1 | 12/2012 | Beaven |
| 2013/0024795 A1 | 1/2013 | Robotham et al. |
| 2013/0159007 A1 | 6/2013 | Brosche et al. |
| 2013/0159034 A1 | 6/2013 | Herter et al. |
| 2013/0159036 A1 | 6/2013 | Keil et al. |
| 2013/0159037 A1 | 6/2013 | Keil et al. |
| 2013/0159047 A1 | 6/2013 | Mayerle et al. |
| 2013/0159060 A1 | 6/2013 | Steinbach |
| 2013/0159061 A1 | 6/2013 | Fessler et al. |
| 2013/0159063 A1 | 6/2013 | Fessler et al. |
| 2013/0159199 A1 | 6/2013 | Keil et al. |
| 2013/0159896 A1 | 6/2013 | Mayerle et al. |
| 2013/0159898 A1 | 6/2013 | Knospe et al. |
| 2013/0159906 A1 | 6/2013 | Knospe et al. |
| 2013/0159908 A1 | 6/2013 | Mayerle et al. |

OTHER PUBLICATIONS

Rockwell Automation, Arena Training Course (2005).

* cited by examiner

LINEAR VISUALIZATION FOR OVERVIEW, STATUS DISPLAY, AND NAVIGATION ALONG BUSINESS SCENARIO INSTANCES

CROSS-REFERENCE TO RELATED APPLICATIONS

The current application is related to the following co-pending and co-owned U.S. patent applications, the disclosure of each of which is incorporated herein in its entirety: application Ser. No. 13/326,270, filed Dec. 14, 2011, entitled "Business Process Guide and Record"; application Ser. No. 13/325,546, filed Dec. 14, 2011, entitled "Monitoring and Control of Business Processes and Scenarios"; application Ser. No. 13/325,605, filed Dec. 14, 2011, entitled "Runtime Generation of Instance Contexts Via Model-Based Data Relationships"; application Ser. No. 13/325,632, filed Dec. 14, 2011, entitled "Visualizing Business Processes or Scenarios in a Business Software Model Using Transit Maps"; application Ser. No. 13/326,026, filed Dec. 14, 2011, entitled "Displaying and Changing Scenario-Based or Process-Based business Configurations"; application Ser. No. 13/326,052, filed Dec. 14, 2011, entitled "Incorporating External Business Process Features Into a Scenario Visualization or Navigation Tool"; application Ser. No. 13/326,075, filed Dec. 14, 2011, entitled "Dynamic Business Scenario Key Performance Indicator Definitions, Real Time Calculations, and Analysis; application Ser. No. 13/326,190, filed Dec. 14, 2011, entitled "Dynamic Enhancement of Context Matching Rules for Business Scenario Models"; application Ser. No. 13/326,230, filed Dec. 14, 2011, entitled "Launch of Target User Interface Features Based on Specific Business Process Instances"; application Ser. No. 13/326,254, filed Dec. 14, 2011, entitled "Multilevel Visualization of Scenario Models and Scenario Instances"; application Ser. No. 13/326,261, filed Dec. 14, 2011, entitled "Process-Based User Authorization Management"; application Ser. No. 13/326,266, filed Dec. 14, 2011, entitled "Correlation-Based Dynamic Determination of Transactional Instance Contexts"; and Ser. No. 13/326,279, filed Dec. 14, 2011, entitled "Seamless Morphing from Scenario Model to System-Based Instance Visualization".

TECHNICAL FIELD

The subject matter described herein relates generally to enhancing user interaction with, and navigation among, features, functions, controls, and the like of an integrated software suite, such as for example an enterprise resource planning solution.

BACKGROUND

Currently available business software solutions, such as for example enterprise resource planning (ERP) systems, generally do not offer users a convenient mechanism to obtain an overview of or to even navigate through the multiple feature sets of such a system guided by a sequence of process steps, tasks, sub-processes, and the like necessary to complete a specific instance of a business process with which the user is associated (e.g. as a supervisor, party responsible for one or more tasks, etc.). Many users miss guidance and orientation, often they are not even aware that they are participating in a concrete process and, hence, can easily become disoriented lost in a feature-rich system. This inability to "see the forest for the trees" can hinder resolution of issues that might cause an instance of the business process to stall or otherwise deviate from a standard template for the business process. As used herein, the term "instance of a business process" and similar descriptive terminology is intended to refer to a specific execution of the business process. For example, for a business process relating to sale of a product, each order taken and filled for that product can be considered as an instance of the business process.

SUMMARY

In one aspect, a method includes linking transactional data associated with a specific instance of a first business scenario to a scenario model representing the first business process. The first business scenario includes a plurality of first business process features. The plurality of first business process features includes an intersecting business process requiring prerequisite action by at least one prerequisite business process feature that is part of a second business scenario. The scenario model includes a linearized representation of the first business scenario in which the plurality of first business process features, the intersecting business process, and the at least one prerequisite business process feature are arranged in a linear sequence. A scenario navigation pane and a work pane are displayed concurrently in a user interface. The scenario navigation pane includes a plurality of first user interface elements arranged in a linear progression to represent the plurality of first business process features in the linear sequence. The work pane includes a plurality of second user interface elements corresponding to functionality provided by one or more feature modules of a business software architecture related to a currently selected one of the plurality of first business process features. The scenario navigation pane changes to expand the linear progression at a selected one of the plurality of first user interface elements to display at least one additional user interface element corresponding to at least one process step involved in completion of the one of the plurality of first business process features corresponding to the selected one of the plurality of first user interface elements.

In some variations one or more of the following features can optionally be included in any feasible combination. A user selection of a different one of the first plurality of user interface elements corresponding to a different one of the plurality of first business process features that the currently selected one can optionally be received, and the work pane can optionally be changed to comprise a plurality of third user interface elements corresponding to functionality provided by one or more feature modules of the business software architecture related to the different one of the plurality of first business process features. A process browser user interface element can optionally be provided in the user interface; a user selection of the process browser user interface element can optionally be received, and a graphical representation of a plurality of business scenarios supported by the business software architecture can optionally be displayed in the user interface. The plurality of business scenarios can optionally include the first business scenario and the second business scenario. The graphical representation can optionally illustrate the first business scenario and the second business scenario intersecting at the intersecting business process feature. A user selection of a different one of the first plurality of user interface elements corresponding to the intersecting business process feature can optionally be received, and the scenario navigation pane can optionally be changed to include a plurality of different user interface elements arranged in a second linear progression to represent a second linear sequence into which a plurality of second business process feature of the second business scenario are arranged according to a second linearized representation of the second business scenario defined in a second scenario model. A visual indicator identifying one of the plurality of first user interface elements corresponding to the currently selected one of the plurality of first business process feature can optionally be provided in the scenario navigation pane. A status indicator showing a current completion status of the business process feature corresponding to the at least one of the plurality of first user interface elements can optionally be associated with at least one of the plurality of first user interface elements in the scenario navigation pane. The current completion status can optionally be calculated based on the linked transactional data.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

Implementations of the current subject matter can provide one or more advantages. For example, end user training time and, accordingly, total cost of ownership associated with an ERP system or other business software solution can be reduced via a more intuitive, user friendly navigation guide through a network of interconnected, complex business processes that make up a business scenario. Additionally, user satisfaction can be increased, both for users in lower level, task-based roles and for those higher level, management roles.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
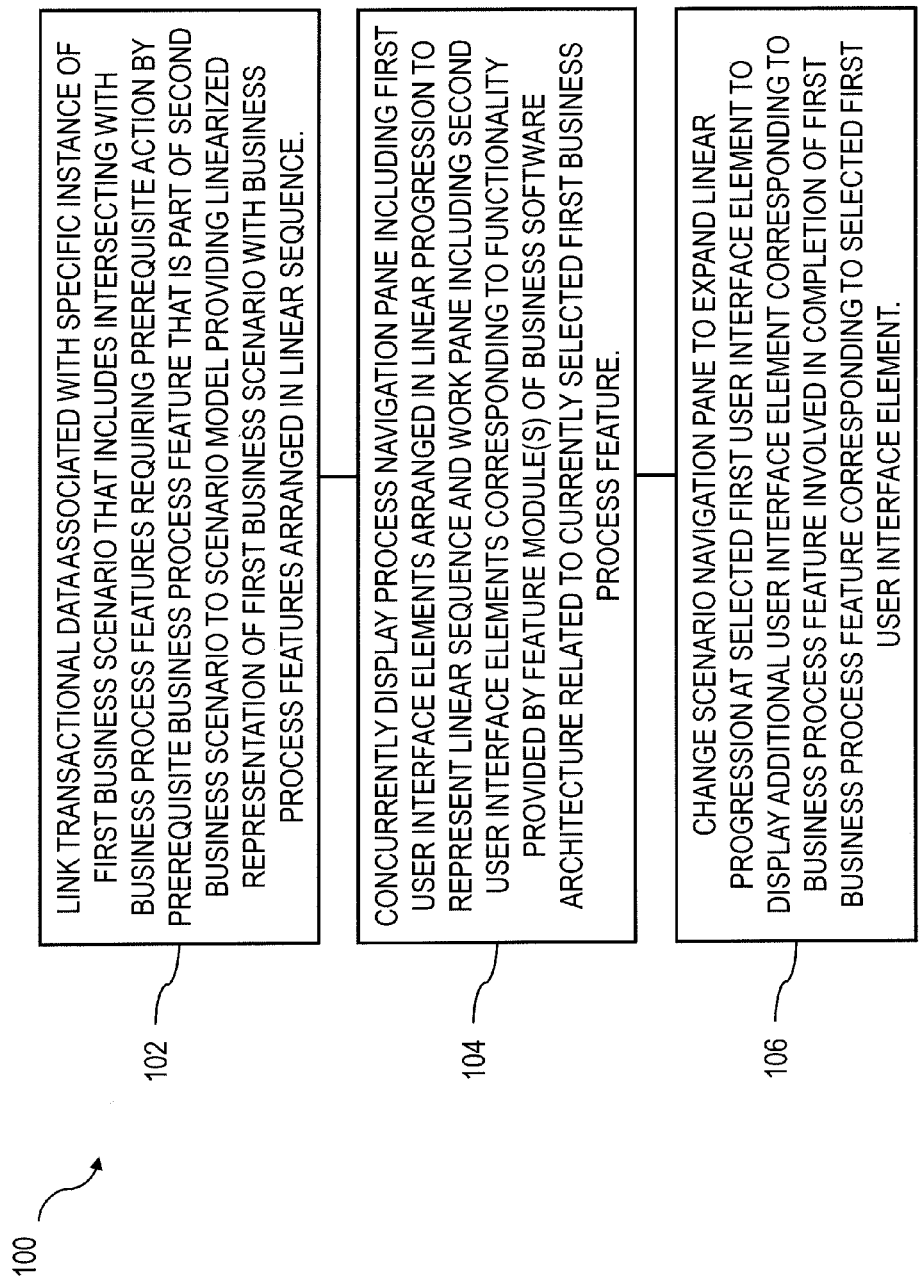
FIG. 1 is a process flow diagram illustrating aspects of a method having one or more features consistent with implementations of the current subject matter.

Currently available ERP and other business software solutions, while providing comprehensive, integrated solutions for streamlining the performance of business tasks, are nonetheless quite complex and navigation can sometimes be a challenge. For example, a business user may encounter difficulties in interacting with the level of complexity inherent with existing graphical notations for specifying business processes, for example in business process diagrams (BPDs) or flow charts created with business process model and notation (BPMN), unified modeling language (UML), event-driven process chains (EPCs), etc. Each of these modeling tools are powerful graphical programming languages that can present a typical user with more complexity and detail regarding a business process than is generally required for day-to-day task completion. In effect, while an overall view of a business process can be obtained, the view can be overly cluttered and difficult to parse. Many business users may prefer a simpler presentation that provides an understanding tailored to orientation and navigation of the feature sets of an ERP or other business software solution. Another potential weakness inherent in the high complexity of ERP and other business software feature sets is the associated difficulty in defining and calculating performance metrics, such as for example key performance indicators (KPIs) and the like.

A strictly role-specific approach as is typically realized in business software based on work centers for different roles, specialized role-specific transactions, etc., is not always helpful for employees who fill more than one such role, e.g. a billing clerk temporarily filling in for a project manager, etc. Especially in smaller companies, one user may be responsible for multiple roles, work centers, or the like and thus may need to traverse the system along a business scenario rather than following a strict functional structure in which tasks are related by their functional features instead of by their association with a specific instance of a business process within a business scenario.

The usability of existing business process visualization approaches for everyday non-technical users can suffer due to an overly technical look-and-feel of the user interface and a certain level of detachment from the reality of any specific instance of a business scenario, which can be defined by an organization to represent organization-specific business features and can include one or more business processes grouped or arranged in a customizable manner. Instead, a typical business software solution may be designed around a bundling of role-based content with task-specific authorizations and a user interface that can be web-based or otherwise platform independent (e.g. a work center or dashboard or the like). This and similar approaches can be used to deliver all the functionality, components, and tools needed to manage all or some of an ERP or other business software solution feature landscape, for example by providing a grouping of the tasks users need to perform their daily operations assembled in one unified interface. A floor plan can be a graphical or other related approach to displaying work centers relating to function modules or the like of a business software architecture (e.g. an ERP system) that a user may need to access to perform his or her daily tasks. For example, a floor plan may include links to work centers as well as a pane or other display feature containing a work list containing work items that a user needs to address or complete. From the work list, the user can navigate by a link or other user interface navigation mechanism directly to an application, work center, floor plan, or the like that is parameterized to handle tasks relating to one of the work items. Each of these approaches tends to emphasize relationships between individual tasks and feature sets relating to those tasks that are based on similarities in the tasks themselves rather than relationships based on relevance to a specific instance of a defined business process. Accordingly, a user may have difficulty in obtaining an overall business scenario or business process context for the specific tasks with which he or she is currently working.

To address these and potentially other issues with currently available solutions, methods, systems, articles of manufacture, and the like consistent with one or more implementations of the current subject matter can, among other possible advantages, provide a linear business scenario visualization that is readily understandable by normal business users who lack an understanding of more complicated business process notations, languages, and the like. Predefined processes and scenarios can be delivered as content, for example by an ERP vendor as well as by one or more providers of content external to an ERP but accessible via the unified ERP interface. User efficiency and end user training time can be improved with a resulting decrease in total cost of ownership of the ERP system or other business software solution by showing a "route map" that condenses all of a complicated, end-to-end business scenario into a scenario navigation pane or the like that can be displayed concurrently with a work pane (that can, for example, display a work center, a work center floor plan, transaction screen, etc.), where a user performs tasks related to the business scenario and the business processes included within the business scenario.

A scenario landscape for an organization can refer to a set including all or some of the business scenarios and/or business processes characterizing an organization's operations. In general a business scenario can includes one or more business processes, process steps, or other business process features. Business process features can include, but are not limited to, one or more of business processes, process steps, sub-processes, tasks, activities, and the like. The business scenarios and business processes can be managed, and tasks relating to the completion of one or more steps of the business processes can be supported by, one or more feature modules of a business software architecture, such as for example an enterprise resource planning (ERP) system. The terms "instance of a business process," "instance of a business scenario," and similar descriptive terminology is intended to refer to a specific execution of a business process or a business scenario, respectively. For example, for a business scenario relating to sale of a product, each order taken and filled for that product can be considered as an instance of the business scenario. A business configuration can be a set of business scenarios including sets of business processes or business process features supported by the business software architecture and optionally customized to reflect the actual, real-life business functions (e.g. end-to-end business processes) performed by employees or other organization members on a recurring basis. A business configuration for an organization customer of a business software architecture is usually set up upon initial installation with occasional modifications or updates provided to reflect changes to the underlying real-life processes and procedures. Such a business configuration is typically constructed like a catalog, and its functions can be structured according to business areas, packages, topics and options. Once the initial business configuration is set up, all decisions are made, and the scoping is done, the business software architecture is ready for productive usage.

FIG. 1 shows a process flow chart 100 illustrating a method having one or more features consistent with implementations of the current subject matter. At 102, transactional data associated with a specific instance of a first business scenario are linked to a scenario model representing the first business scenario. The first business scenario includes a plurality of first business processes, including an intersecting business process requiring prerequisite action by at least one prerequisite business process that is part of a second business scenario. In other words, the intersecting business process can be a part of both the first business scenario and the second business scenario, and subsequent business processes of the first business scenario can require prior completion of the intersecting business process. As a non-limiting example, the first business scenario can be an end-to-end business scenario relating to receiving an order, producing a product, delivering the product, and receiving payment for the product while the second business scenario can be an end-to-end business scenario for producing the product. The second business scenario in this example can include business processes that occur after production of the product but that do not directly impact completion of the first business scenario (e.g. ordering of materials to replace those used in the production, production equipment maintenance tasks, disposal of waste products, etc.). Such business processes need not be incorporated into the business scenario model for the first business scenario. In another example, the second business scenario can deal with recording of employee time, and can include steps relating to maintaining records of employee identification numbers, handling of time sheets, etc. that do not relate directly to a specific project instance. However, steps such as maintain time records relating to the specific project, approving or rejecting that recorded time, and monitoring or reviewing recorded time can have an impact on final invoicing of a project or the like and therefore can be included in a scenario model of the first business scenario.

At 104, a scenario navigation pane and a work pane are displayed concurrently in a user interface. The scenario navigation pane includes a plurality of first user interface elements arranged in a linear progression to represent the linear sequence, and the work pane includes a plurality of second user interface elements corresponding to functionality provided by one or more feature modules of a business software architecture related to a currently selected one of the plurality of first business processes. At 106, the scenario navigation pane is changed to expand the displayed linear progression of the first user interface elements at a selected one of the plurality of first user interface elements to display at least one additional user interface element corresponding to at least one process step involved in completion of the one of the plurality of first business processes corresponding to the selected one of the plurality of first user interface elements. In other words, one or more of the plurality of first business processes can include one or more process steps that need not be shown in first overview of the business scenario when it is displayed in the scenario navigation pane. However, selection by a user of a first user interface element corresponding to this business process can cause the linear progression to expand to show additional user interface elements representative of the process steps.

Figure 2:
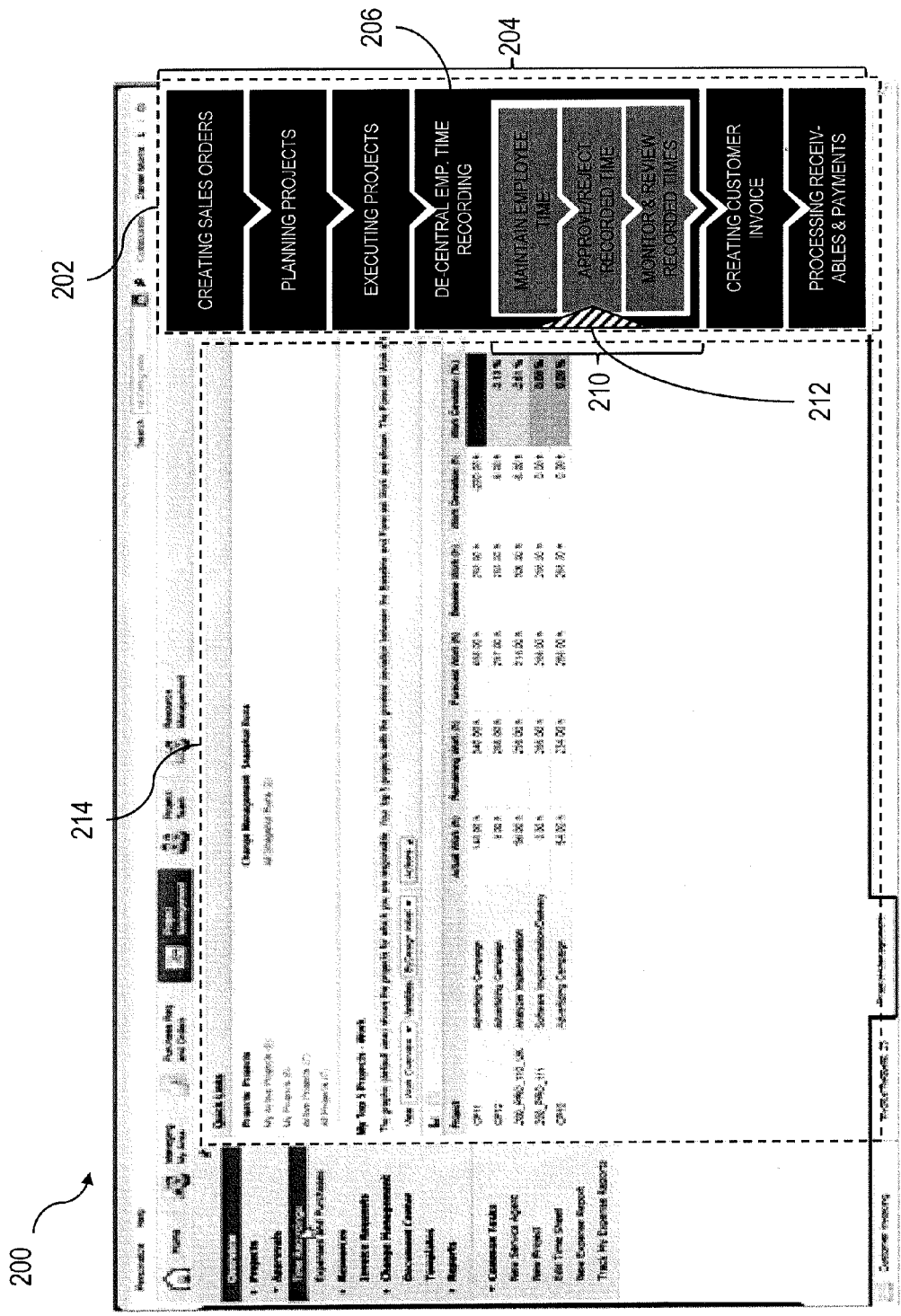
FIG. 2 shows a screenshot of a user interface.

FIG. 2 shows a screenshot 200 of a user interface illustrating features consistent with an implementation of the current subject matter. A scenario navigation pane 202 contains a group of first user interface elements 204 arranged in a linear progression to represent the linear sequence of business processes in the scenario model of the currently actively business scenario. Included in the group of first interface elements 204 is an element 206 representing an intersecting business process as discussed above. In this example, the intersecting business process is "de-central employee time recording." As a further feature, the process steps 210 incorporated in this business process can, in optional implementations, be expanded by interaction of the user with the parent business process interface element (e.g. by a mouse or trackpad click, a "right click," a keystroke and mouse combination, or any other mode of receiving user input to elect a function in a user interface). A visual indicator, in this example an arrow icon 212 can be displayed to indicate which business process of the first business scenario is currently being worked on. Second user interface elements representing one or more functions, features, etc. of a feature module of the business software architecture can be concurrently displayed in a work pane 214.

Figure 3:
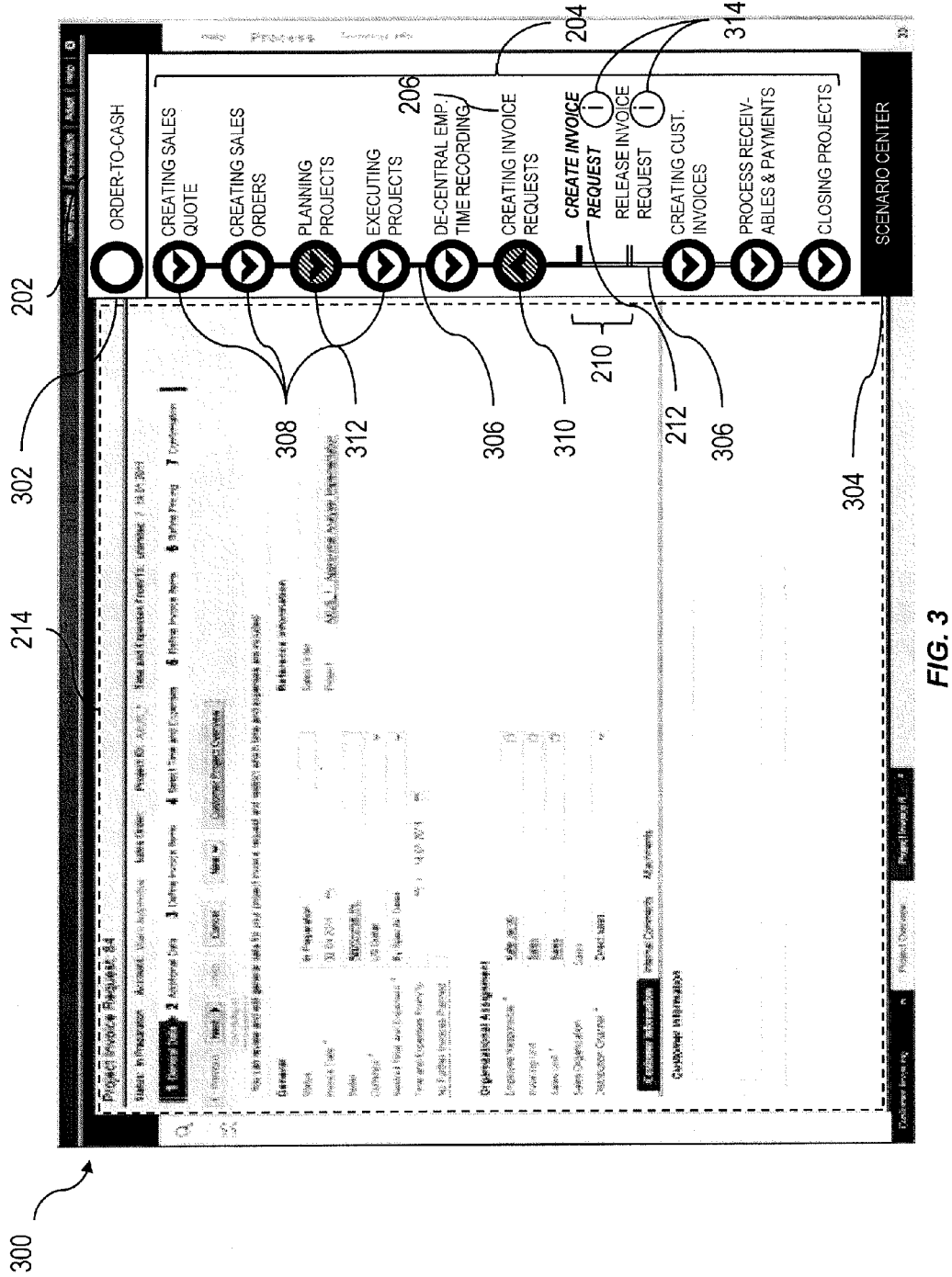
FIG. 3 shows another screenshot of a user interface.

FIG. 3 shows another screenshot 300 of a user interface illustrating features consistent with an implementation of the current subject matter. As in FIG. 2, a scenario navigation pane 202 and a work pane 214 are concurrently displayed. A plurality of first user interface elements 204 are displayed in the process navigation pane 202 and arranged in a linear progression to represent the linear sequence of business processes and/or process steps in the scenario model of the currently actively business scenario. A first user interface element 206 corresponding to a business process 206 having additional process steps can be expanded as shown in FIG. 3 to display additional user interface elements 210 corresponding to the process steps. Also as shown in FIG. 3, the currently active business scenario can be identified by one or more scenario identifier user interface elements 302. A scenario browser user interface element 304 can link to a scenario browser or "scenario center" that displays an overall scenario map showing intersections between scenarios and providing links to navigate to the other scenarios.

The first user interface elements 204 can be displayed in a manner similar to a transit route map with each business process step or, optionally, process step being represented like a stop on the route. In this manner, a familiar visual format can rapidly convey additional information about a current context within a specific instance of the business scenario as well as status information about the various business processes along the "route" to completion of the business scenario instance. For example, a route line 306 connecting the "stops" can be presented with a first visual effect (e.g. color, brightness, shade, dots or dashes, etc.) up to the "stop" representing the business process that is currently "active" with related functionality being provided in the work pane 214. The currently active business process can be further indicated using textual or visual cues, such as for example color, shading, font, a highlighting box, etc. As a non-limiting example, the name of the business process displayed in conjunction with the user interface element 212 corresponding to the currently active business process or process step in FIG. 3 is formatted in a bold and italicized font. A different second visual effect can be used for the route line 306 leading to the "stops" past the currently active business process or process step. The icons 308 used to represent the "stops" in the scenario navigation pane can also include visual cues to inform a user about status, other business processes or process steps that are included within the currently displayed business process or process step user interface elements and that can be revealed by a user action to expand the route map, or the like.

Also in the example shown in FIG. 3, the expanded business process 206 is also an intersecting business process that includes additional process steps that are part of a second business scenario. The additional business processes are illustrated by first user elements 210 incorporated directly into the route map without branching to maintain the linear progression of the scenario model. The first user interface element 310 representing the "stop" corresponding to this business process can include a different visual presentation than other non-intersecting "stops and can further include other visual presentation features to indicate that it is currently expanded as shown in FIG. 3. The "stop" first user interface element 312 corresponding to another intersecting business process (e.g. planning projects in the example of FIG. 3) can include features indicating that it is an intersecting business process with expandability, but that it currently is not expanded. Additional first user interface elements 314 (e.g. the "i" icons shown in FIG. 3) can provide additional details about one or more of the business processes or process steps.

In an implementation, a larger icon for a stop can represent an intersecting or otherwise related business scenario and can optionally be shown as a circular shape. A smaller icon for a stop can represent an activity or task that is to be performed by a specific user. These smaller stops can optionally be shown as rectangular shapes.

In an implementation, the scenario navigation pane 202 can display navigation and/or status content that is specific to a current business scenario instance related to the content displayed in the work pane, thereby increasing the relevance of the scenario navigation display to the user as compared to a static (generic) scenario model. A user can see a display of progress with the currently active instance of the business scenario, including but not limited to actual users, deadlines, and the like instead of a static template representing a generic instance of the business scenario.

An organization making use of a business software architecture such as an ERP can define its own best practices and publish them immediately to all users by adding/modifying content in a process repository. A scenario navigation pane 202 including one or more of the features described herein can hide unnecessarily complex scenario structures, such as branching out to business processes of adjacent scenarios, or loops where one business process or process step is executed several times, from business users and thereby provide only the level of detail necessary to understand issues relating to a specific instance of a given business scenario. Rather than overwhelming a user with too much detail, the scenario navigation pane 202 as it is integrated into the business software or ERP solution can allow a user to see the necessary level of contextual detail to complete his or her daily tasks. A scenario navigation pane 202 can simplify these complex structures by integrating them into the single line of a transit map that business users can easily understand and intuitively use for navigation. The scenario navigation pane 202 thereby offers both an intuitive way to visualize the entire business scenario inside the operative business software architecture, ERP system, or the like and allows for a convenient navigation along an actual instance of a business scenario, both to preceding as well as to future business processes, process steps, and the like.

As the information presented in the scenario navigation pane 202 can be based on current, live transactional data linked to the scenario model, the status of each business process or process step can be displayed either graphically or textually or both in the scenario navigation pane 202, thereby allowing a user to see a current state of the entire business scenario instance and readily determine which business process(es), process step(s), task(s), etc. need to be completed next. Furthermore, the scenario navigation pane 202 can offer navigation that is specific to the exact objects the user needs to see for each individual business process, process step, task, etc. For example, the work pane 214 can be populated with user interface elements corresponding to the proper business object for a given task associated with a selected business process, process step, task, etc.

Additional features that can optionally be part of an implementation can include but are not limited to allowing business experts or end users to attach specific documentation to business scenarios, business processes, process steps, tasks, etc.; editing the scenario model to provide for company-specific best practices; and including external business processes, process steps, tasks, etc, that occur or are otherwise handled outside the ERP system into the scenario model with (optionally) a live navigation link and a callback mechanism to allow reporting of the status by the external application.

The process navigation pane 202 can present scenario context available in the business software or ERP system to detect scenario details pertaining to the specific scenario instance. For example business scenarios, business processes, and process steps can be linked to specific activity instances that the current user actually needs to access the relevant object instances. Guidance can thereby be as specific as the system allows. For example, clicking on an activity can launch a program, a work center view, a transaction screen, or the like that allows the user to perform one or more activities related to the specific business process, process step, task, etc. The program, work center view, transaction screen, or the like is not launched with a blank screen, but can instead be pre-populated with transactional data, master data, or the like relating to object instances associated with the currently active business scenario instance. One or more, or optionally all, of the business processes or process steps can have a specific status, such as, but not limited to, done, in progress, ready to be executed, or not ready to be executed. Further details, potentially including, but not limited to, users responsible, business object instances involved in that activity, deadlines relevant to that activity, alerts/errors that occurred with respect to this activity, etc., for each business process, process step, task, etc. can be displayed on request (e.g., mouse-over, expanding click, etc.).

Figure 4:
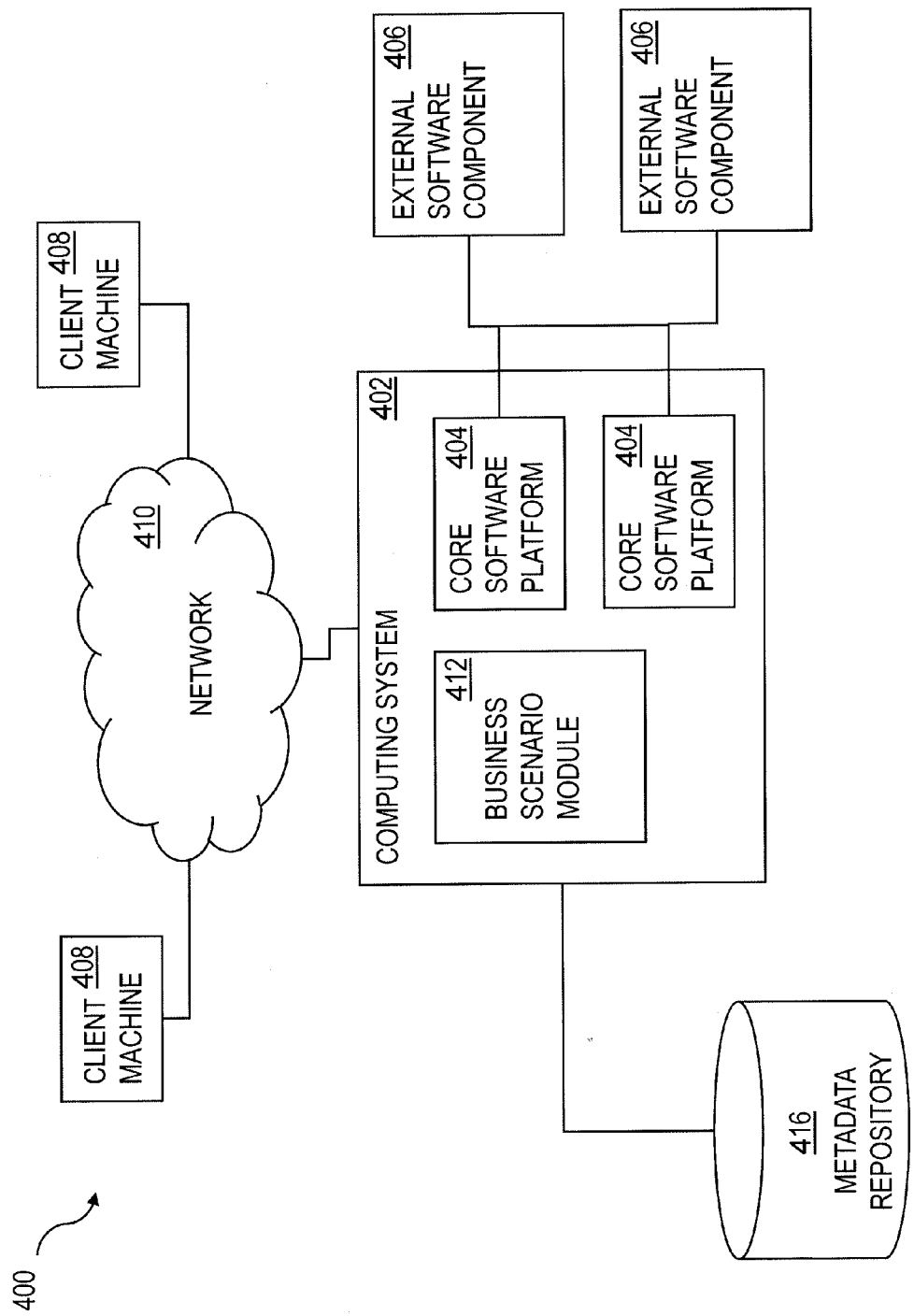
FIG. 4 is a diagram illustrating aspects of a system showing features consistent with implementations of the current subject matter.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. FIG. 4 shows a diagram of a system consistent with such an implementation. A computing system 402 can include one or more core software platform modules 404 providing one or more features of the ERP system. The computing system can also aggregate or otherwise provide a gateway via which users can access functionality provided by one or more external software components 406, which can optionally be provided by service providers external to the core software platform modules 404. Client machines 408 can access the computing system, either via a direct connection, a local terminal, or over a network 410 (e.g. a local area network, a wide area network, a wireless network, the Internet, or the like). A business process guidance and recording module 412 can be hosted on the computing system 402 or alternatively, on an external system accessible over a network connection. The business scenario guidance and recording module 412 can optionally include one or more discrete software and/or hardware modules that perform operations such as those described herein.

The business scenario guidance and recording module 412 can access one or more metadata repositories 416 and/or other data repositories that can store the definition of one or more business scenarios, business processes, etc., as well as data relating to concrete instances of the data objects (e.g. business objects) that are relevant to a specific instance of a business scenario. In some examples, the definition can optionally be stored as a business object. In some implementations, the business object can include a template definition of a standard business scenario. The template definition that can optionally be modified via one or more extensions that are stored in the one or more metadata repositories 416.

Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services of an ERP system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 5:
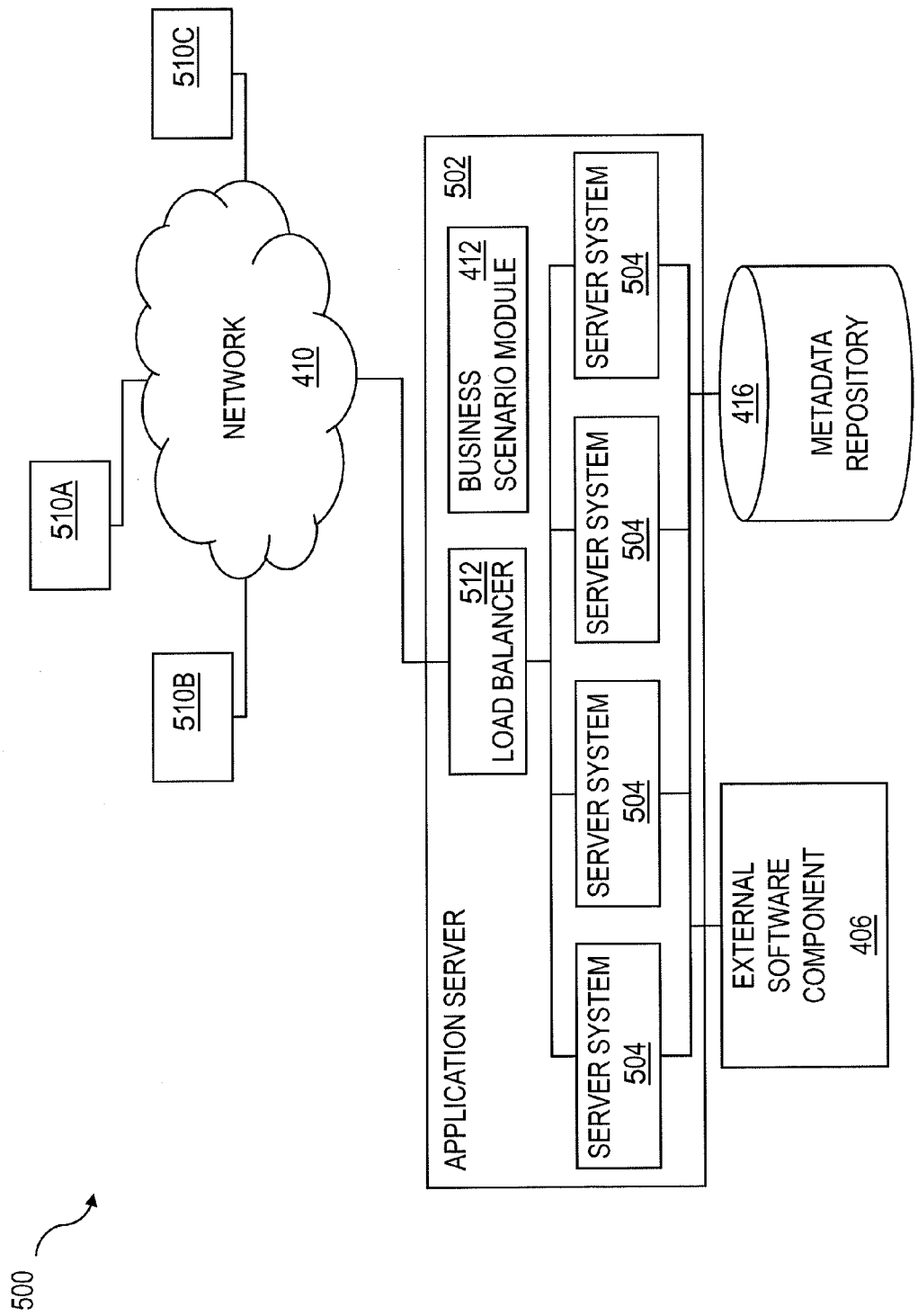
FIG. 5 is a diagram illustrating aspects of a system showing features consistent with implementations of the current subject matter.

FIG. 5 shows a block diagram of a multi-tenant implementation of a software delivery architecture 500 that includes an application server 502, which can in some implementations include multiple server systems 504 that are accessible over a network 410 from client machines operated by users at each of multiple organizations 510A-510C (referred to herein as "tenants" of a multi-tenant system) supported by a single software delivery architecture 500. For a system in which the application server 502 includes multiple server systems 504, the application server can include a load balancer 512 to distribute requests and actions from users at the one or more organizations 510A-510C to the one or more server systems 504. Instances of the core software platform 404 (not shown in FIG. 5) can be executed in a distributed manner across the server systems 504. A user can access the software delivery architecture across the network using a thin client, such as for example a web browser or the like, or other portal software running on a client machine. The application server 502 can access data and data objects stored in one or more data repositories 416. The application server 502 can also serve as a middleware component via which access is provided to one or more external software components 406 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 502 that includes multiple server systems 504 that handle processing loads distributed by a load balancer 512. Potential benefits from such an arrangement can include, but are not limited to, high and reliably continuous application server availability and minimization of unplanned downtime, phased updating of the multiple server systems 504 to permit continuous availability (one server system 504 can be taken offline while the other systems continue to provide services via the load balancer 512), scalability via addition or removal of a server system 504 that is accessed via the load balancer 512, and de-coupled lifecycle processes (such as for example system maintenance, software upgrades, etc.) that enable updating of the core software independently of tenant-specific customizations implemented by individual tenants.

As in the example illustrated in FIG. 4, the metadata repository 416 can store a business object that represents a template definition of a standard business process. Each individual tenant 510A-510C can customize that standard template according to the individual business process features specific to business of the organization to which that tenant is assigned. Customizations can be stored as extensions in the metadata repository.

Figure 6:
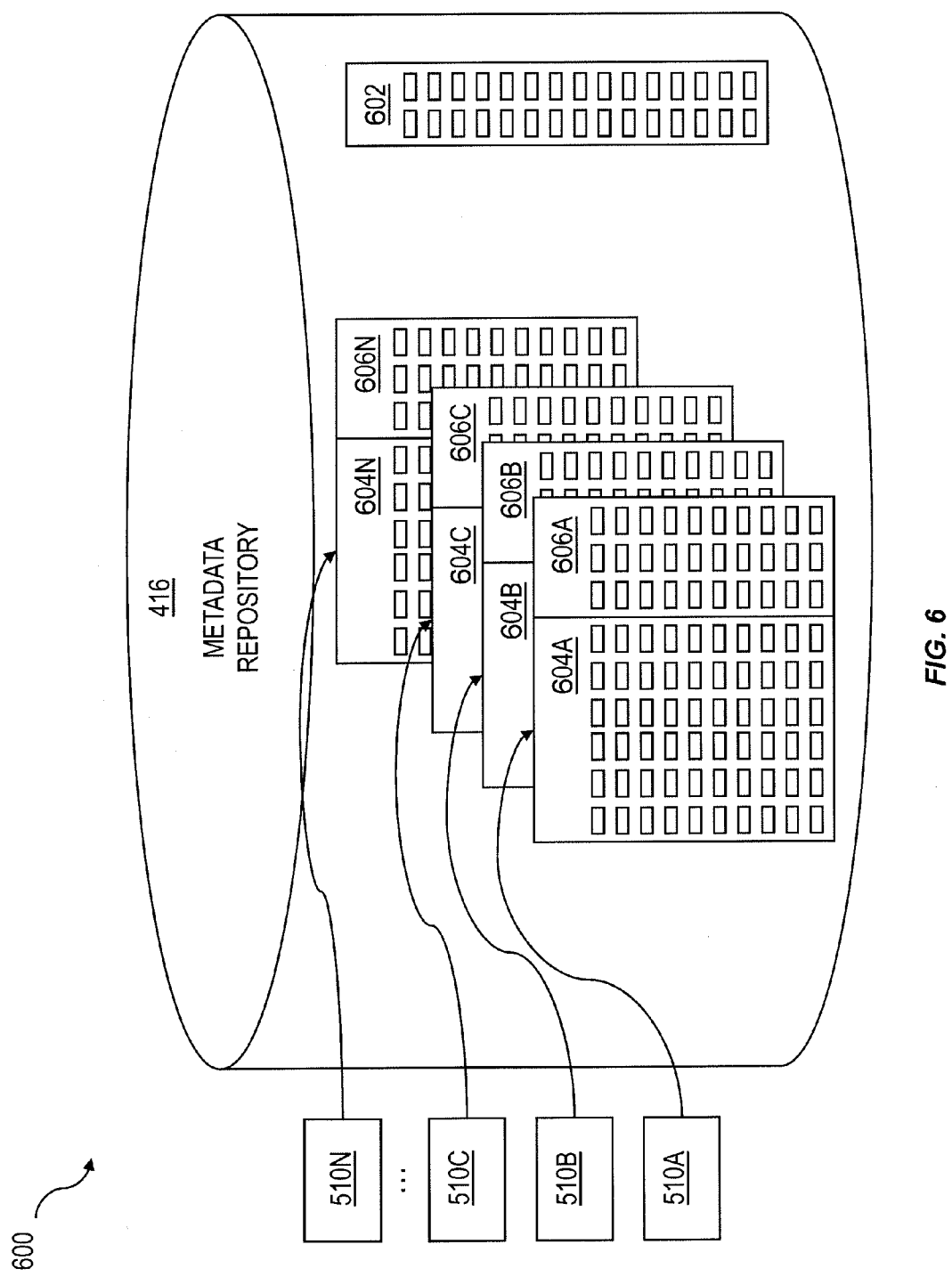
FIG. 6 is a diagram illustrating a data repository showing features consistent with implementations of the current subject matter.

To provide for customization of the business process for each of multiple organizations supported by a single software delivery architecture 500, the data and data objects stored in the metadata repository 416 and/or other data repositories that are accessed by the application server 502 can include three types of content as shown in FIG. 6: core software platform content 602 (e.g. a standard definition of a business process), system content 604 and tenant content 606. Core software platform content 602 includes content that represents core functionality and is not modifiable by a tenant. System content 604 can in some examples be created by the runtime of the core software platform and can include core data objects that store concrete data associated with specific instances of a given business process and that are modifiable with data provided by each tenant. The data retained in these data objects are tenant-specific: for example, each tenant 510A-510N can store information about its own inventory, sales order, etc. Tenant content 606A-606N includes data objects or extensions to other data objects that are customized for one specific tenant 510A-510N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 606 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 602 and system content 604 and tenant content 606 of a specific tenant are accessed to provide the business process definition and/or the status information relating to a specific instance of the business process according to customizations and business data of that tenant such that each tenant is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

linking transactional data associated with a specific instance of a first business scenario to a scenario model representing the first business process, the first business scenario comprising a plurality of first business process features, the plurality of first business process features comprising an intersecting business process requiring prerequisite action by at least one prerequisite business process feature that is part of a second business scenario, the scenario model comprising a linearized representation of the first business scenario in which the plurality of first business process features, the intersecting business process, and the at least one prerequisite business process feature are arranged in a linear sequence;

displaying, concurrently in a user interface, a scenario navigation pane and a work pane, the scenario navigation pane comprising a plurality of first user interface elements arranged in a linear progression to represent the plurality of first business process features in the linear sequence, the work pane comprising a plurality of second user interface elements corresponding to functionality provided by one or more feature modules of a business software architecture related to a currently selected one of the plurality of first business process features; and changing the scenario navigation pane to expand the linear progression at a selected one of the plurality of first user interface elements to display at least one additional user interface element corresponding to at least one process step involved in completion of the one of the plurality of first business process features corresponding to the selected one of the plurality of first user interface elements.

2. A computer program product as in claim 1, wherein the operations further comprise:

receiving a user selection of a different one of the first plurality of user interface elements corresponding to a different one of the plurality of first business process features that the currently selected one; and changing the work pane to comprise a plurality of third user interface elements corresponding to functionality provided by one or more feature modules of the business software architecture related to the different one of the plurality of first business process features.

3. A computer program product as in claim 1, wherein the operations further comprise:

providing a process browser user interface element in the user interface;

receiving a user selection of the process browser user interface element; and displaying, in the user interface, a graphical representation of a plurality of business scenarios supported by the business software architecture, the plurality of business scenarios comprising the first business scenario and the second business scenario, the graphical representation illustrating the first business scenario and the second business scenario intersecting at the intersecting business process feature.

4. A computer program product as in claim 1, wherein the operations further comprise:

receiving a user selection of a different one of the first plurality of user interface elements corresponding to the intersecting business process feature; and changing the scenario navigation pane to comprise a plurality of different user interface elements arranged in a second linear progression to represent a second linear sequence into which a plurality of second business process feature of the second business scenario are arranged according to a second linearized representation of the second business scenario defined in a second scenario model.

5. A computer program product as in claim 1, wherein the operations further comprise providing a visual indicator in the scenario navigation pane, the visual indicator identifying one of the plurality of first user interface elements corresponding to the currently selected one of the plurality of first business process feature.

6. A computer program product as in claim 1, wherein the operations further comprise associating, with at least one of the plurality of first user interface elements in the scenario navigation pane, a status indicator showing a current completion status of the business process feature corresponding to the at least one of the plurality of first user interface elements, the current completion status being calculated based on the linked transactional data.

7. A system comprising:

at least one programmable processor; and a machine-readable medium storing instructions that, when executed by the, cause the at least one programmable processor to perform operations comprising:

linking transactional data associated with a specific instance of a first business scenario to a scenario model representing the first business process, the first business scenario comprising a plurality of first business process features, the plurality of first business process features comprising an intersecting business process requiring prerequisite action by at least one prerequisite business process feature that is part of a second business scenario, the scenario model comprising a linearized representation of the first business scenario in which the plurality of first business process features, the intersecting business process, and the at least one prerequisite business process feature are arranged in a linear sequence;

displaying, concurrently in a user interface, a scenario navigation pane and a work pane, the scenario navigation pane comprising a plurality of first user interface elements arranged in a linear progression to represent the plurality of first business process features in the linear sequence, the work pane comprising a plurality of second user interface elements corresponding to functionality provided by one or more feature modules of a business software architecture related to a currently selected one of the plurality of first business process features; and changing the scenario navigation pane to expand the linear progression at a selected one of the plurality of first user interface elements to display at least one additional user interface element corresponding to at least one process step involved in completion of the one of the plurality of first business process features corresponding to the selected one of the plurality of first user interface elements.

8. A system as in claim 7, wherein the operations further comprise:

receiving a user selection of a different one of the first plurality of user interface elements corresponding to a different one of the plurality of first business process features that the currently selected one; and changing the work pane to comprise a plurality of third user interface elements corresponding to functionality provided by one or more feature modules of the business software architecture related to the different one of the plurality of first business process features.

9. A system as in claim 7, wherein the operations further comprise:
providing a process browser user interface element in the user interface;
receiving a user selection of the process browser user interface element; and
displaying, in the user interface, a graphical representation of a plurality of business scenarios supported by the business software architecture, the plurality of business scenarios comprising the first business scenario and the second business scenario, the graphical representation illustrating the first business scenario and the second business scenario intersecting at the intersecting business process feature.

10. A system as in claim 7, wherein the operations further comprise:
receiving a user selection of a different one of the first plurality of user interface elements corresponding to the intersecting business process feature; and
changing the scenario navigation pane to comprise a plurality of different user interface elements arranged in a second linear progression to represent a second linear sequence into which a plurality of second business process feature of the second business scenario are arranged according to a second linearized representation of the second business scenario defined in a second scenario model.

11. A system as in claim 7, wherein the operations further comprise providing a visual indicator in the scenario navigation pane, the visual indicator identifying one of the plurality of first user interface elements corresponding to the currently selected one of the plurality of first business process feature.

12. A system as in claim 7, wherein the operations further comprise associating, with at least one of the plurality of first user interface elements in the scenario navigation pane, a status indicator showing a current completion status of the business process feature corresponding to the at least one of the plurality of first user interface elements, the current completion status being calculated based on the linked transactional data.

13. A computer-implemented method comprising:
linking transactional data associated with a specific instance of a first business scenario to a scenario model representing the first business process, the first business scenario comprising a plurality of first business process features, the plurality of first business process features comprising an intersecting business process requiring prerequisite action by at least one prerequisite business process feature that is part of a second business scenario, the scenario model comprising a linearized representation of the first business scenario in which the plurality of first business process features, the intersecting business process, and the at least one prerequisite business process feature are arranged in a linear sequence;
displaying, concurrently in a user interface, a scenario navigation pane and a work pane, the scenario navigation pane comprising a plurality of first user interface elements arranged in a linear progression to represent the plurality of first business process features in the linear sequence, the work pane comprising a plurality of second user interface elements corresponding to functionality provided by one or more feature modules of a business software architecture related to a currently selected one of the plurality of first business process features; and
changing the scenario navigation pane to expand the linear progression at a selected one of the plurality of first user interface elements to display at least one additional user interface element corresponding to at least one process step involved in completion of the one of the plurality of first business process features corresponding to the selected one of the plurality of first user interface elements.

14. A computer-implemented method as in claim 13, further comprising:
receiving a user selection of a different one of the first plurality of user interface elements corresponding to a different one of the plurality of first business process features that the currently selected one; and
changing the work pane to comprise a plurality of third user interface elements corresponding to functionality provided by one or more feature modules of the business software architecture related to the different one of the plurality of first business process features.

15. A computer-implemented method as in claim 13, further comprising:
providing a process browser user interface element in the user interface;
receiving a user selection of the process browser user interface element; and
displaying, in the user interface, a graphical representation of a plurality of business scenarios supported by the business software architecture, the plurality of business scenarios comprising the first business scenario and the second business scenario, the graphical representation illustrating the first business scenario and the second business scenario intersecting at the intersecting business process feature.

16. A computer-implemented method as in claim 13, further comprising:
receiving a user selection of a different one of the first plurality of user interface elements corresponding to the intersecting business process feature; and
changing the scenario navigation pane to comprise a plurality of different user interface elements arranged in a second linear progression to represent a second linear sequence into which a plurality of second business process feature of the second business scenario are arranged according to a second linearized representation of the second business scenario defined in a second scenario model.

17. A computer-implemented method as in claim 13, further comprising providing a visual indicator in the scenario navigation pane, the visual indicator identifying one of the plurality of first user interface elements corresponding to the currently selected one of the plurality of first business process feature.

18. A computer-implemented method as in claim 13, further comprising associating, with at least one of the plurality of first user interface elements in the scenario navigation pane, a status indicator showing a current completion status of the business process feature corresponding to the at least one of the plurality of first user interface elements, the current completion status being calculated based on the linked transactional data.

19. A computer-implemented method as in claim 13, wherein at least one of the linking, the displaying, and the changing is performed by at least one programmable processor.

* * * * *